(No Model.) 4 Sheets—Sheet 1.

H. B. SEARS & J. E. TUTTLE.
HARNESS.

No. 458,430. Patented Aug. 25, 1891.

WITNESSES.
J. W. Dolan
Fred. B. Dolan.

INVENTORS.
Harry B. Sears
James E. Tuttle
by their attys
Clarke & Raymond (No Model.) 4 Sheets—Sheet 2.

H. B. SEARS & J. E. TUTTLE.
HARNESS.

No. 458,430. Patented Aug. 25, 1891.

WITNESSES
J. M. Dolan
Fred. B. Dolan.

INVENTORS.
Harry B. Sears
James E. Tuttle
by their attys
Clarke & Raymond

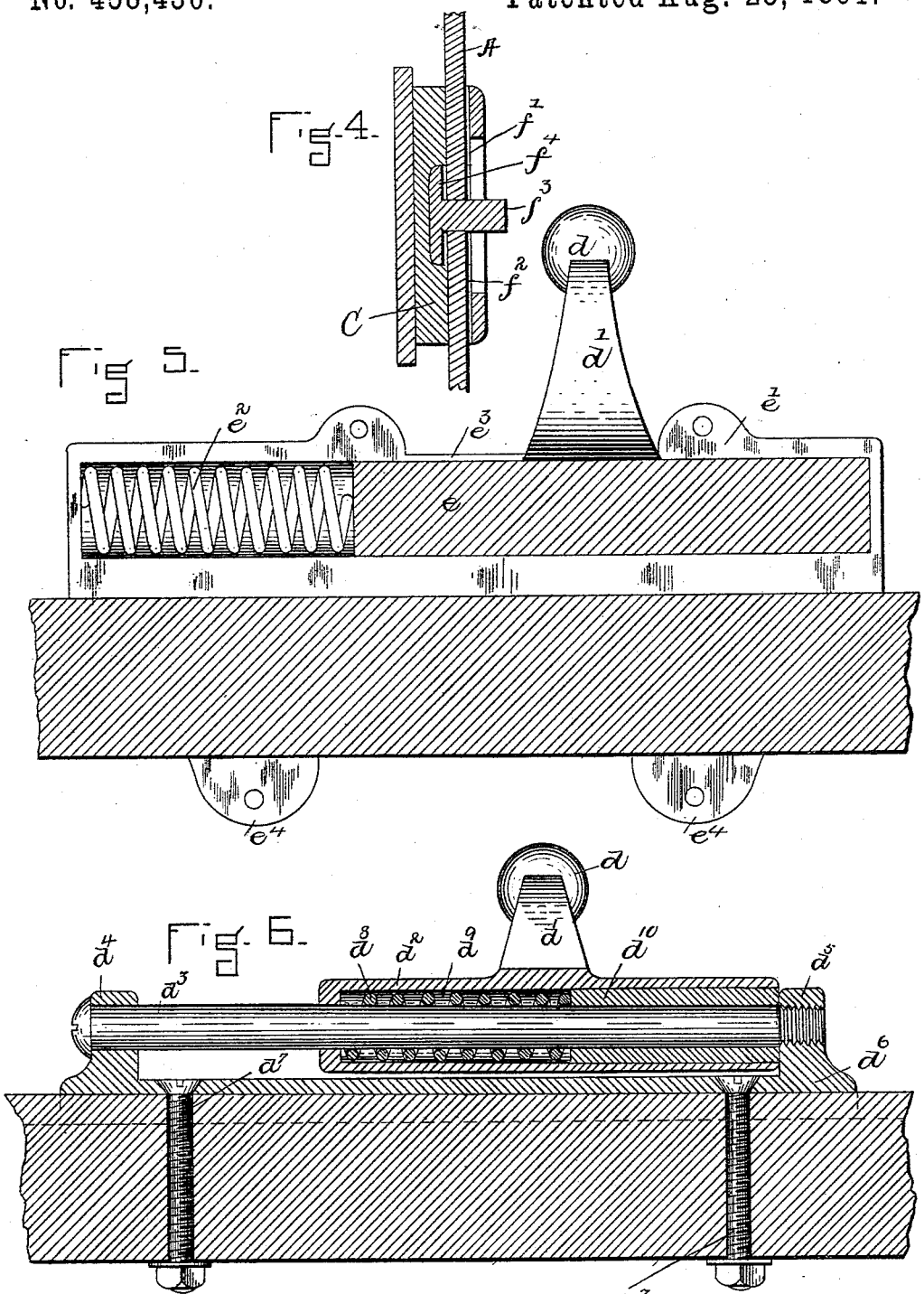

(No Model.) 4 Sheets—Sheet 4.
H. B. SEARS & J. E. TUTTLE.
HARNESS.
No. 458,430. Patented Aug. 25, 1891.
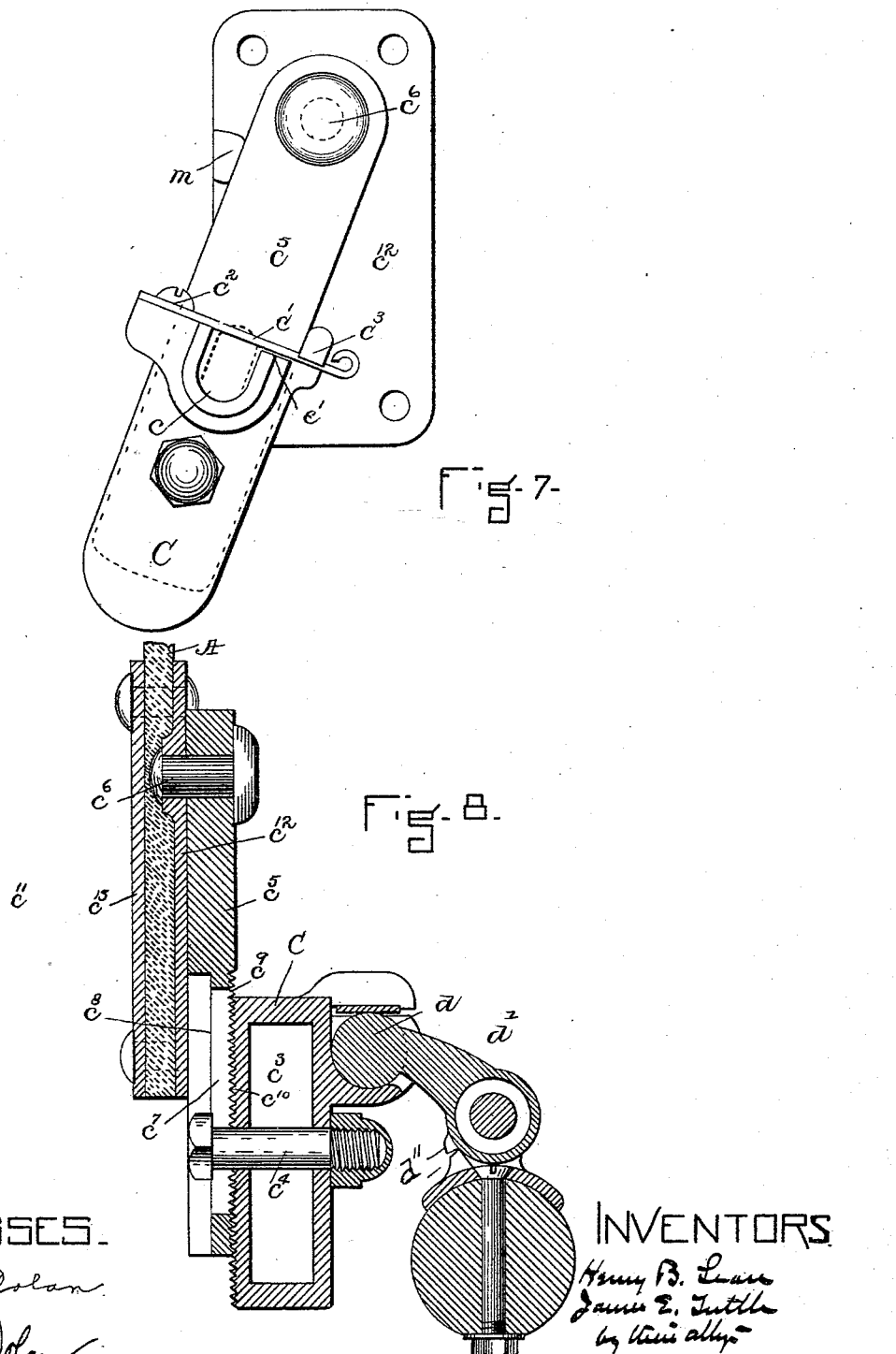
WITNESSES.
J. M. Dolan
Fred. B. Dolan
INVENTORS
Henry B. Sears
James E. Tuttle
by their attys
Clarke & Raymond

UNITED STATES PATENT OFFICE.

HENRY B. SEARS, OF WALPOLE, AND JAMES E. TUTTLE, OF CHELSEA, MASSACHUSETTS; SAID TUTTLE ASSIGNOR TO SAID SEARS.

HARNESS.

SPECIFICATION forming part of Letters Patent No. 458,430, dated August 25, 1891.

Application filed May 21, 1890. Serial No. 352,655. (No model.)

*To all whom it may concern:*

Be it known that we, HENRY B. SEARS, of Walpole, in the county of Norfolk, and JAMES E. TUTTLE, of Chelsea, in the county of Suffolk, both in the State of Massachusetts, citizens of the United States, have invented a new and useful Improvement in Harnesses, of which the following is a full, clear, and exact description, reference being had to the accompanying drawings, forming a part of this specification, in explaining its nature.

Figure 1:
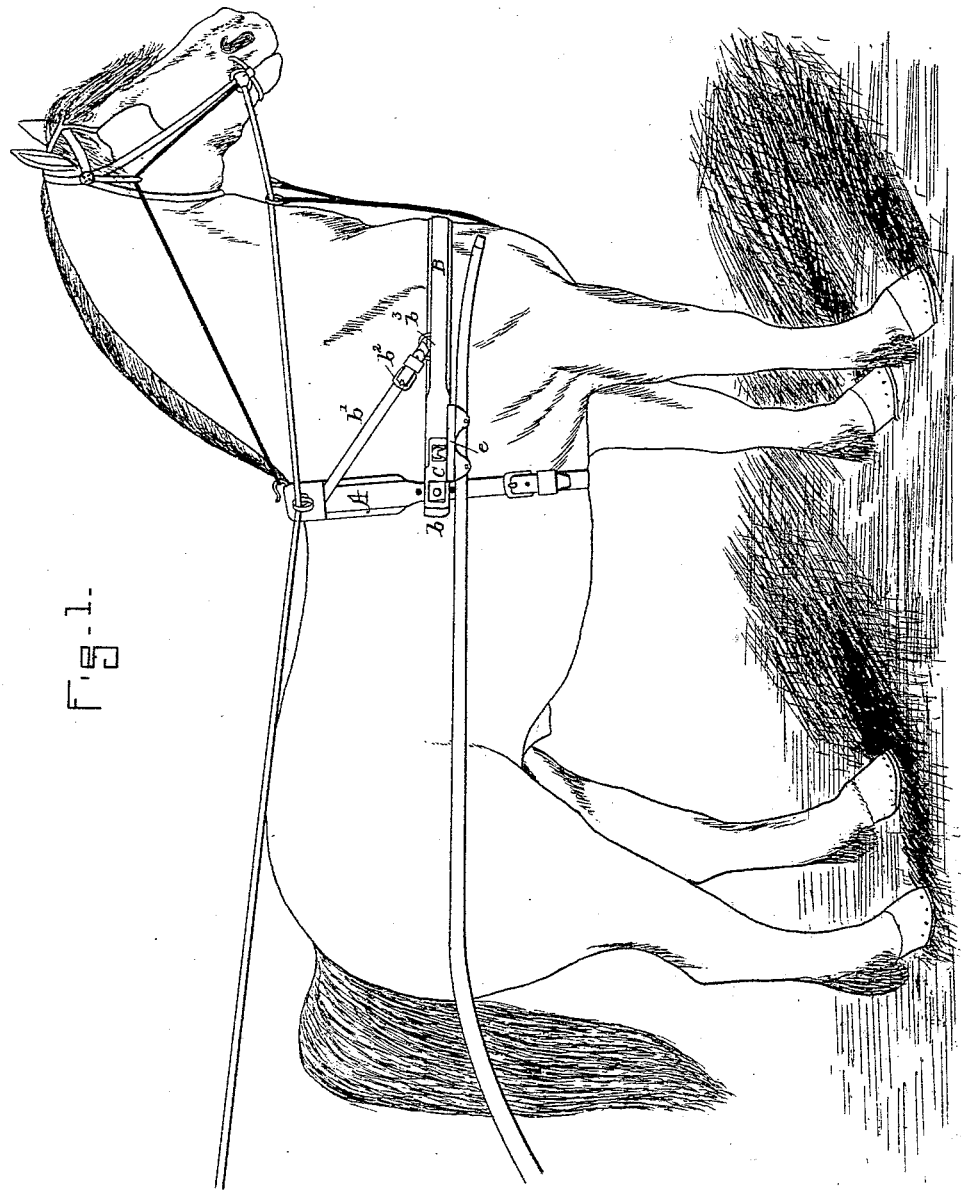
Figures 2, 3:
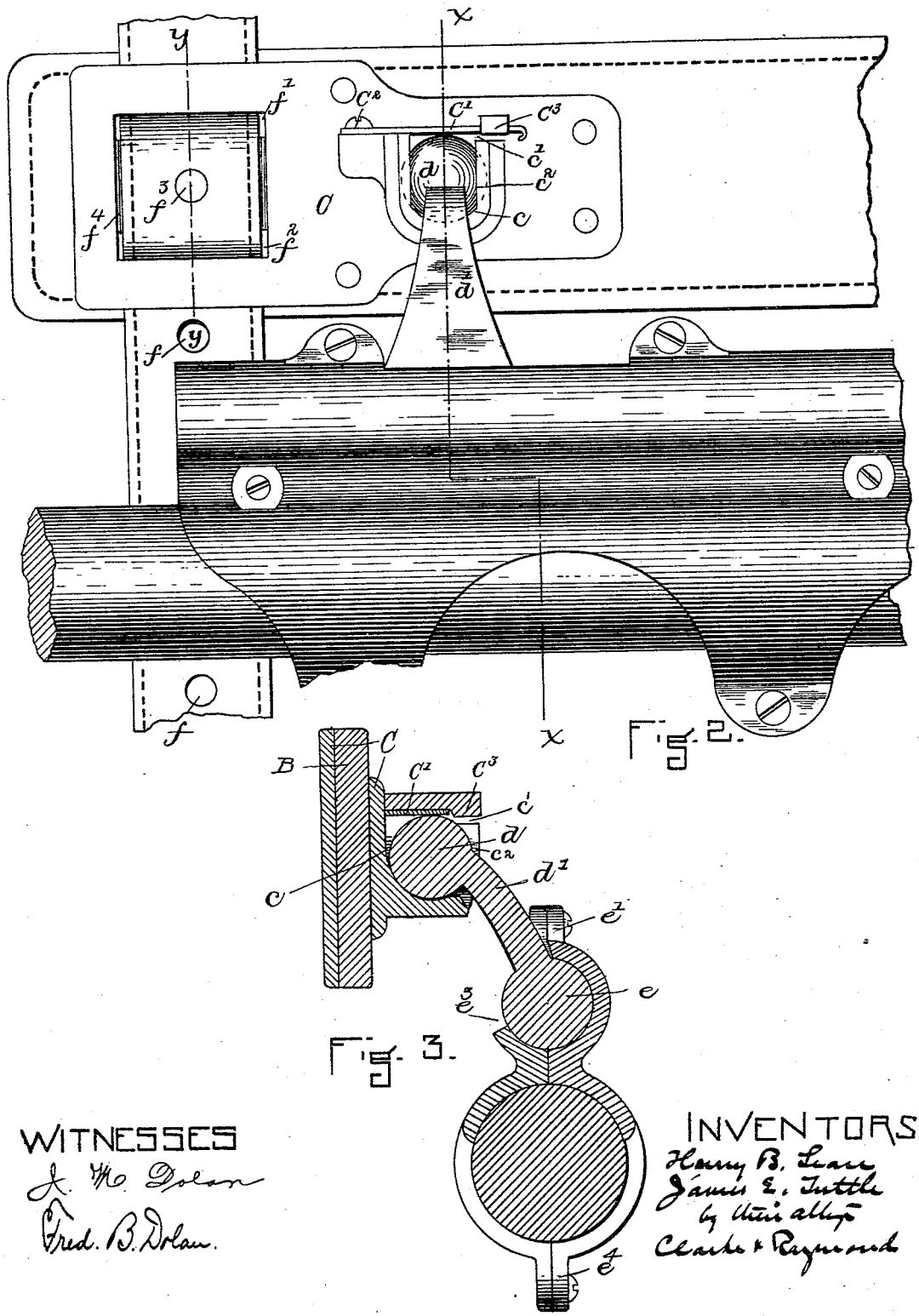

In the drawings, Figure 1 is a view representing the harness as applied to a horse. Fig. 2 is a view, enlarged in side elevation, representing one manner of attaching the harness to the shafts of a vehicle. Fig. 3 is a section upon the dotted line $x$ $x$ of Fig. 2. Fig. 4 is a section upon the dotted line $y$ $y$ of Fig. 2. Fig. 5 is a view, in longitudinal section, of one of the shafts and the attachment upon it. Fig. 6 is a view, in longitudinal section, representing the shaft attachment in a modified form. Figs. 7 and 8 represent, in elevation and section, modifications which are hereinafter referred to.

The invention comprises a harness, simple of construction, easily and quickly applied, and attached or connected with the shafts by a single connection upon each side, the object of the invention being to cheapen the cost of harness, to facilitate their placing and removal, and the hitching to the shafts of the vehicle.

The harness comprises two principal parts—namely, the saddle A and the breast-plate B. The breast-plate is connected at its rear end $b$ on each side with the saddle and in a manner to permit of horizontal adjustment. It is also connected with the saddle by the stay or supporting straps $b'$, which extend from each side of the saddle near its top, through which, preferably, they are permanently attached to the breast-plate buckles $b^2$, attached to the breast-plate at $b^3$. (See Fig. 1.) The ends of the breast-plate also have a vertical adjustment upon the saddle, and the saddle is secured to the horse by a girth in the ordinary way. There is attached to the breast-plate at each of its rear ends a metal plate C, having a socket $c$, open at its top $c'$ and its front $c^2$, and of a shape in horizontal section to receive and retain a ball $d$ upon the end of the tongue $d'$, one of which is secured to each member of the shafts. The ball enters the socket through the top opening, the side opening of course being of less width than the diameter of the ball, but of sufficient width to permit the tongue at the point where it joins the ball to move freely. The ball is held in place in the socket by a latch $C'$, which is pivoted at $C^2$, to move horizontally outward from a position over the opening $c'$, and which preferably is made of spring-steel, and is held in a locked position by means of a catch $C^3$, beneath which it is adapted to be moved into and out of locking relation to the ball.

In Fig. 2 we have represented the socket-plate and socket as secured directly to the rear end of the breast-plate. We prefer, however, the form of construction represented in Figs. 7 and 8, where the plate and socket, while secured to each end of the breast-plate, serve also, in connection with a swinging arm, to connect the end of the breast-plate to the saddle, and in this form of the invention the socket plate or holder C is provided with a hole $c^3$ to receive an end of the breast-plate, and it is secured to the breast-plate by the bolt or pin $c^4$, which extends across the opening $c$ through a hole in the breast-plate, and the breast-plate has any desired number of holes, whereby it may be moved in and out in relation to the plate C. The bolt $c^4$ serves also to lock the plate C and the end of the breast-plate to the hanger $c^5$, which is pivoted at $c^6$ to the saddle, and to provide vertical adjustment of the plate C and socket in relation to the saddle we have formed in the hanger the slot $c^7$ and bolt-head-receiving recess $c^8$, in which the bolt $c^4$ is movable vertically, whereby the position of the plate C may be varied vertically in relation to the pivot $c^6$. To securely lock the plate and hanger together, we have formed in the face of the hanger the serrations or saw-teeth $c^9$ and in the back of the plate C matching serrations or saw-teeth $c^{10}$, and to make an adjustment it is necessary to slacken the bolt $c^4$ sufficiently to disengage the teeth $c^{10}$ from the teeth $c^9$, when the plate C is moved to the position desired, and the bolt again tightened to lock the teeth in their new position and secure the plate to the hanger. We have represented the hanger $c^5$ as secured to the saddle by means of a pivot $c^6$, which is headed upon a boss $c^{11}$, extending inwardly from the metal plate $c^{12}$, and which extends through a hole in the plate and hole in the hanger and is headed on the outside of the hanger. The plate $c^{12}$ is riveted to the inner plate $c^{13}$ by rivets passing through both plates and the saddle. (See Fig. 8.) The ball $d$ and tongue $d'$ are attached to each member of the shaft in a manner to provide them with limited longitudinal movements thereon in opposition to springs. The construction we prefer is that represented in Figs. 6 and 8, where the tongue $d'$ is shown as integral with a sleeve $d^2$. The sleeve is attached to the shaft by a rod $d^3$, preferably a screw-rod, which passes through a hole in the lug $d^4$ and screws into a threaded hole in the lug $d^5$, both lugs $d^4$ $d^5$ being integral with a curved plate $d^6$, which is fastened to the shaft by bolt $d^7$. (See Fig. 6.) The sleeve $d^2$ is shorter than the rod $d^3$, and has longitudinal movement thereon in opposition to the spring $d^8$, which is represented as inclosed in the hole $d^9$ in the sleeve and as bearing at one end against the stationary long collar $d^{10}$ and at the other end against the end of the sleeve, the spring acting to throw or move the sleeve outward or away from the collar $d^{10}$ toward the end of the rod. This construction is simple, gives to the tongue an endwise movement upon the shaft, and also a swinging movement upon a vertical plane of which the rod $d^3$ is the center. We have shown upon the plate $d^6$ a stop $d^{11}$, which is adapted to come in contact with the tongue and hold it from falling, so that by lifting the shafts the balls may be lifted or disengaged from the sockets.

In Figs. 1, 2, 3, and 6 we have shown the tongue $d'$ as integral with a circular or round support $e$, and as held in a case $e'$, and this round support has endwise movement in the case $e'$ in opposition to the spring $e^2$. The case has an opening $e^3$ through which the tongue extends, and is fastened to the shaft by clips $e^4$, the clips providing means by which the attachment may be adjusted lengthwise the shaft. We prefer, however, the construction represented in Figs. 6, 7, and 8.

In Figs. 2 and 4 we show the way in which the ends of the breast-plate, and consequently the sockets, are adjusted vertically on the saddle. This is obtained by providing the ends of the saddle-strap with holes $f$ and forming in the plate C the strap-holes $f'$ $f^2$, through which the strap extends, and a pin or stud $f^3$ upon the section $f^4$ of the plate is adapted to engage one of the holes $f$, and this secures the breast-plate to the saddle. We prefer, however, the connection between the breast-plate and saddle represented in Figs. 7 and 8.

In use to harness the horse it is simply necessary to slip the saddle and breast-plate over the head and to connect and tighten the saddle-girth, put on the bridle, and attach the shafts to the harness by lifting them, engaging the balls or latches on each member of the shaft with its corresponding socket, and locking the ball in place by its locking or holding latch, there being but two connections between the shafts and the harness, one on each side, and the connections acting both to take the place of traces or tugs and other portions of ordinary harnesses not described. By mounting the tongues upon the shafts so that they have limited endwise and radial movements sufficient freedom or flexibility of connection between the harness and the shafts is obtained to prevent the motion or movement of the horse from being communicated to the vehicle, and to permit also proper movement of the shafts in relation to the harness. There is arranged upon the plates $c^{12}$ a lug $m$, against which the swinging arms C come to rest when it is desired to back the horse and vehicle.

In some instances the breast-plate may be connected with the saddle by straps differently located from those above specified, and we may use in lieu of the plate a collar and hames.

Having thus fully described our invention, we claim and desire to secure by Letters Patent of the United States—

1. The improved harness comprising the saddle A, breast-plate B, connected with the saddle, and the breast-plate-supporting straps $b'$, extending from the saddle to the breast-plate, and shaft-engaging devices carried by or attached to said breast-plate or breast-plate and saddle at or near their juncture, as and for the purpose described.

2. The combination of a harness comprising the breast-plate B, saddle A, breast-plate straps $b'$, extending from the saddle to the breast-plate, and ball or tongue receivers carried by the harness at a point contiguous to the juncture of the breast-plate and saddle, with the shafts of the vehicle having attached thereto movable tongues having enlarged ends to enter said sockets and thereby connect the shafts with the harness, as and for the purpose described.

3. The combination of a harness having upon each side a socket $c$, open at the top $c'$ and at the sides $c^2$ and adapted to receive and hold a ball $d$ upon the end of a tongue $d'$, a ball-holder for holding the ball in said socket, and said tongue $d'$ and $d$, the tongue being secured to the shaft to have a radial movement in relation thereto, as and for the purposes described.

4. The combination of a harness having upon each side a socket $c$, open at the top $c'$ and at the sides $c^2$ and adapted to receive and hold a ball $d$ upon the end of a tongue $d'$, a ball-holder for holding the ball in said socket, and said tongue $d'$ and $d$, the tongue being secured to the shaft to have a radial movement in relation thereto and also a longitudinal movement in relation thereto in opposition to the stress of a spring, substantially as described.

5. The combination, in a harness, of the breast-plate B, saddle A, and pivoted hangers $c^5$, connecting the saddle on each side with the rear ends of the breast-plate, the said breast-plate also bearing sockets for receiving the shaft-attaching devices, as and for the purpose described.

6. The combination of the breast-plate B, the socket-plates, one at each rear end of the breast-plate, having the hole $c^3$ for the breast-plate and adjustable upon the breast-plate by means of the bolt $c^4$, the said plate having also a socket for receiving and holding the end of a shaft-attaching device, the saddle, and the hangers $c^5$, connecting the saddle with the plates C, as and for the purposes described.

7. The combination, in a harness, of the plate $d^6$, adapted to be fastened to the shaft, the lugs $d^4$ $d^5$, the rod $d^3$, the sleeve $d^2$, and the tongue $d'$, having the enlarged end extending therefrom, and the spring $d^8$, as and for the purpose described.

8. The combination, in a harness, of the supports C, having sockets, as specified, the swinging tongues $d'$, having enlargements to enter said sockets, the shafts to which the tongues are secured, and the stops $d^{11}$, as and for the purposes described.

HENRY B. SEARS.
JAMES E. TUTTLE.

Witnesses:
F. F. RAYMOND, 2d,
FRED. B. DOLAN.